UNITED STATES PATENT OFFICE.

VITTORIO VOLPATO, OF MILAN, ITALY.

PROCESS FOR THE PREPARATION OF A PHOSPHATE FERTILIZER.

1,229,684.   Specification of Letters Patent.   Patented June 12, 1917.

No Drawing.   Application filed October 27, 1916.   Serial No. 127,996.

*To all whom it may concern:*

Be it known that I, VITTORIO VOLPATO, a subject of the Kingdom of Italy, and resident of Milan, Italy, have invented certain new and useful Improvements in and Relating to Processes for the Preparation of a Phosphate Fertilizer, of which the following is a specification.

My invention relates to a new process for the production of phosphatic fertilizers from phosphorite (tricalcium phosphate).

While phosphorite is not assimilable by plants, I have discovered, that if the following materials previously ground and mixed together are heated with finely ground phosphorite, a phosphocarbonate will result which is readily assimilable.

The materials used are: 40% dolomite, 25% sodium carbonate; 35% sodium sulfate. Such materials, preferably in the said proportions are intimately mixed together and 6% of the whole mixture is mixed with phosphorite containing 60% of tricalcium phosphate.

The final mixture is heated to a temperature of 750° C. and upon issuing from the furnace will be quenched by being treated with water.

I claim:

1. A process of rendering available the phosphoric acid of phosphate rock which comprises mixing the ground phosphate rock with a smaller quantity of a mixture of alkali earth metal carbonate, alkali metal carbonate and alkali metal sulfate, heating the mixture to about 750° C., and then treating the product with water.

2. A process of rendering available the phosphoric acid of phosphate rock which comprises mixing the ground phosphate rock with a smaller quantity of a mixture of dolomite, sodium carbonate and sodium sulfate, heating the mixture to about 750° C., and then treating the product with water.

3. A process of preparing an assimilable phosphatic fertilizer consisting in roasting a mixture comprising 100 parts of phosphorite containing about 60% tricalcium phosphate and about 6 parts of a mixture of 40% dolomite, 25% sodium carbonate and 35% sodium sulfate, at a temperature of about 750° C., and thereafter treating the calcined mass with water.

In testimony whereof I affix my signature, in presence of two witnesses.

DR. VITTORIO VOLPATO.

Witnesses:
LUIS F. HERNÁNDEZ,
GRAU GIACOMO GUARNURI.